(12) United States Patent
Lee (10) Patent No.: US 9,863,833 B2
(45) Date of Patent: Jan. 9, 2018

(54) LEAK SENSOR FOR SIDE DETECTION

(71) Applicant: FLOWNIX CO., LTD., Gyeonggi-do (KR)

(72) Inventor: Jae Heui Lee, Gyeonggi-do (KR)

(73) Assignee: FLOWNIX CO., LTD., Gyeonggi-do (KR)

( * ) Notice: Subject to any disclaimer, the term of this patent is extended or adjusted under 35 U.S.C. 154(b) by 158 days.

(21) Appl. No.: 15/074,667

(22) Filed: Mar. 18, 2016

(65) Prior Publication Data
US 2016/0282216 A1    Sep. 29, 2016

(30) Foreign Application Priority Data
Mar. 26, 2015    (KR) .......................... 10-2015-0042563

(51) Int. Cl.
*G01M 3/16*    (2006.01)
*G01M 3/04*    (2006.01)

(52) U.S. Cl.
CPC .............. *G01M 3/16* (2013.01); *G01M 3/165* (2013.01); *G01M 3/04* (2013.01); *G01M 3/045* (2013.01)

(58) Field of Classification Search
CPC ..... E04D 13/006; G01M 3/165; G01M 3/045; G01M 3/16; G01M 3/04; G08B 21/20
See application file for complete search history.

(56) References Cited

U.S. PATENT DOCUMENTS

| | | | | |
|---|---|---|---|---|
| 2,553,986 A | * | 5/1951 | Statham | G01L 1/22 324/549 |
| 2,691,698 A | * | 10/1954 | Schmidt | H01B 7/328 174/102 R |
| 3,721,898 A | * | 3/1973 | Dragoumis | G01M 3/045 138/104 |
| 4,206,632 A | * | 6/1980 | Suzuki | G01M 3/165 174/11 R |
| 4,480,251 A | * | 10/1984 | McNaughton | H04M 3/28 324/525 |
| 4,859,989 A | * | 8/1989 | McPherson | G01R 31/021 174/120 SC |
| 4,949,076 A | * | 8/1990 | Wann | G01M 3/16 324/533 |

(Continued)

FOREIGN PATENT DOCUMENTS

| | | | | | |
|---|---|---|---|---|---|
| JP | | 54104017 A | * | 8/1979 | |
| JP | | 54133196 A | * | 10/1979 | .............. G01M 3/16 |

(Continued)

*Primary Examiner* — David A Rogers
(74) *Attorney, Agent, or Firm* — Nixon & Vanderhye P.C.

(57) ABSTRACT

A leak sensor includes a base layer which is formed by soaking a plate-shaped structure into a resin solution, particularly a fluorine-based resin solution, or formed of a plate-shaped structure of a resin, particularly a fluorine-based resin; and a sensor layer in which a leak detection part having a predetermined area is formed by coating or printing a mixture of a liquid resin or a liquid fluorine-based resin and a conductive material on the base layer in a predetermined pattern, wherein the leak detection part of the sensor layer is formed on a side surface of the sensor layer to be exposed to the outside. Therefore, even though the sensor is not located just under the leaked fluid, the sensor becomes in contact with the fluid, and thus can detect the fluid leakage.

9 Claims, 6 Drawing Sheets

(56) References Cited

U.S. PATENT DOCUMENTS

| | | | | |
|---|---|---|---|---|
| 5,017,908 | A * | 5/1991 | Macpherson | G01M 3/045 174/11 R |
| 5,190,069 | A * | 3/1993 | Richards | G01M 3/18 137/312 |
| 5,203,202 | A * | 4/1993 | Spencer | G01M 3/165 73/40 |
| 6,025,725 | A * | 2/2000 | Gershenfeld | H01F 17/0006 324/652 |
| 6,175,310 | B1 * | 1/2001 | Gott | G01M 3/165 340/604 |
| 6,526,807 | B1 * | 3/2003 | Doumit | G01M 3/04 340/605 |
| 6,978,659 | B2 * | 12/2005 | Phillips | G01M 3/16 340/605 |
| 7,292,155 | B2 * | 11/2007 | Vokey | E04D 13/006 340/602 |
| 7,631,666 | B1 * | 12/2009 | Ng | F16L 11/081 116/206 |
| D618,567 | S * | 6/2010 | Brooking | D10/56 |
| 9,651,446 | B1 * | 5/2017 | Adleman, Jr. | G01M 3/042 |
| 2007/0046481 | A1 * | 3/2007 | Vokey | E04D 13/006 340/602 |
| 2009/0173143 | A1 * | 7/2009 | Yu | G01M 3/165 73/40 |
| 2013/0305815 | A1 * | 11/2013 | Yu | G01M 3/165 73/40 |
| 2015/0219520 | A1 * | 8/2015 | Yu | H01B 1/24 73/40 |
| 2015/0362397 | A1 * | 12/2015 | Yu | G01M 3/045 73/40 |

FOREIGN PATENT DOCUMENTS

| | | | | |
|---|---|---|---|---|
| JP | 55149833 | A * | 11/1980 | G01M 3/165 |
| JP | 57066336 | A * | 4/1982 | G01M 3/045 |
| JP | 57082736 | A * | 5/1982 | G01M 3/042 |
| JP | 62021033 | A * | 1/1987 | |
| JP | 02306132 | A * | 12/1990 | |
| KR | 10-0909242 | | 7/2009 | |
| KR | 10-2014-0073110 | | 6/2014 | |
| KR | 10-1505439 | | 3/2015 | |

* cited by examiner

LEAK SENSOR FOR SIDE DETECTION

CROSS-REFERENCE TO RELATED APPLICATION(S)

This application claims priority under 35 U.S.C. §119 to Korean Patent Application No. 10-2015-0042563, filed in Korea on Mar. 26, 2015, whose entire disclosure is hereby incorporated by reference.

BACKGROUND

1. Field

The present invention relates to a leak sensor capable of detecting a fluid leakage through side detection, and more particularly, to a leak sensor for side detection, which is in contact with a fluid dropping and flowing on a floor even though not located just under the leaked fluid and thus detects the fluid leakage.

2.Background

Generally, many chemical substances are used in a semiconductor manufacturing processes. For example, a cleaning solution which is used in a cleaning operation after cutting and polishing processes of a wafer, a photosensitive solution which is used in a photosensitive process of the wafer, a developing solution which is used in a developing process of the wafer, and an etching solution which is used in an etching process of the wafer, are used in the semiconductor manufacturing processes.

These chemical substances are transferred to in-situ positions for performing each of the processes through transfer pipes. The chemical substances may leak to an outside of the transfer pipes due to a defect or deterioration of the transfer pipes. Since the leaked chemical substances may have a bad influence on other devices or components in semiconductor manufacturing sites, it is necessary to detect a leak in the transfer pipes and to rapidly take a corresponding measure.

In a method of detecting the leakage in the transfer pipes, a positive (+) electrical wire and a negative (−) electrical wire are disposed in parallel, and an absorbent is disposed between the wires, and a change in resistance occurring by the leaked chemical substances is measured. A sensor using such a method is referred to as a line type leak sensor.

Here, in a leakage detection method of the line type leak sensor, the positive (+) wire (or electric conductor) and the negative (−) wire (or electric conductor) are disposed at a drain which extends from the transfer pipe and collects the chemical substances leaked from the transfer pipes, and thus whether leakage occurs is measured. An example of the line type leak sensor is disclosed in Korean Patent Application Publication No.10-2007-005234.

Meanwhile, there is an area type leak sensor which has a wider leakage detection area than the line type leak sensor. The area type leak sensor forms a predetermined detection area by arranging a plurality of (+) conductor wires and (−) conductor wires to cross each other or arranging one pair of (+) conductor wire and (−) conductor wire in a zigzag pattern. An example of such an area type leak sensor is disclosed in Japanese Patent Application Publication No. 1989-171340.

Here, the area type leak sensor is in contact with a leaked fluid which falls down, and thus can detect fluid leakage. However, in such a detection method, the leak sensor should be directly disposed under portions at which the occurrence of leakage is expected, and when the leaked fluid does not fall down on an upper surface of the leak sensor, there is a problem that the leak cannot be detected. That is, the conventional area type leak sensor has a problem that the occurrence of the leak cannot be detected unless the fluid which leaks and flows on a floor corresponds to the amount sufficient to reach said upper surface of the leak sensor, except the case in which the leak sensor is located just under a leak position of the fluid.

SUMMARY

The present invention has an object to provide a leak sensor for side detection, which can be in contact with a fluid flowing on a floor even though being not located just under the leaked fluid and thus can detect leakage of the fluid.

According to an aspect of the present invention, there is provided a leak sensor including a base layer which is formed by soaking a plate-shaped structure into a resin solution, particularly a fluorine-based resin solution, or formed of a plate-shaped structure of a resin, particularly a fluorine-based resin; and a sensor layer in which a leak detection part having a predetermined area is formed by coating or printing a mixture of a liquid resin, particularly a fluorine-based liquid resin and a conductive material on the base layer in a predetermined pattern, wherein the leak detection part of the sensor layer is formed on a side surface of the sensor layer such that the side surface thereof is exposed to the outside and the base layer and the sensor layer form one sensor module.

A protection layer formed of the resin, particularly the fluorine-based resin may be coupled to an upper surface of the sensor layer.

The leak sensor may include two or more sensor modules, and may further include a plurality of through-grooves which pass through at least one sensor module such that the sensor layer of the at least one sensor module is exposed laterally to the outside and a sensor layer arranged below the base layer passed through is exposed upwardly to the outside, to thus form a leak detection part of the leak sensor; and wherein in the lowest sensor module a through-groove is not formed.

The leak sensor may include two or more sensor modules, and may further include a plurality of through-grooves which pass through all of the protection layer and the sensor modules such that they are exposed laterally to the outside to form a leak detection part of the leak sensor.

An accommodation groove having a predetermined area may be formed at a lower surface of the lowest sensor module, and an adhesive tape for adhering the base layer to another structure or a bottom is attached to the accommodation groove.

The base layer and the sensor layer may be plastic-worked for a predetermined period of time at a predetermined temperature to form the sensor module, and the sensor module is coupled to another sensor module to be arranged one above the other.

The coupling between the sensor modules may be performed by plastic-working the sensor modules for the predetermined period of time at the predetermined temperature.

An edge of the protection layer may extend outward further than the sensor layer.

The details of one or more embodiments are set forth in the accompanying drawings and the description below. Other features will be apparent from the description and drawings, and from the claims.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to the embodiments of the present disclosure, examples of which are illustrated in the accompanying drawings.

Figure 1:
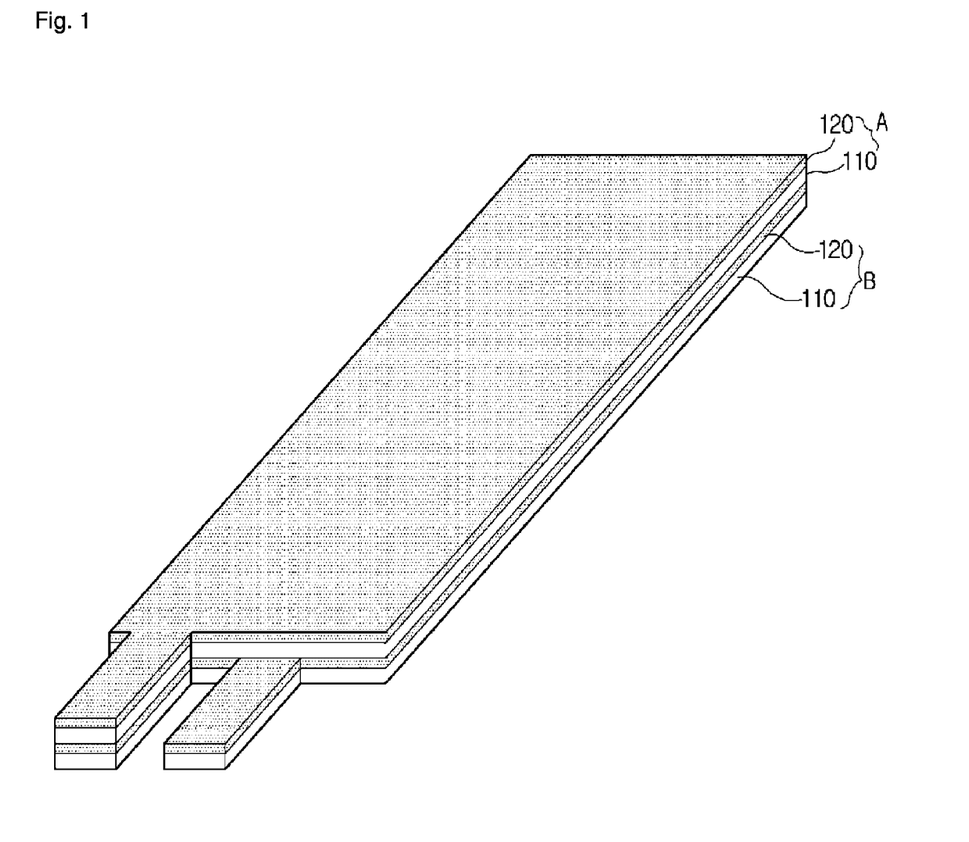
FIG. 1 is a perspective view schematically illustrating a leak sensor for side detection according to a first embodiment of the present invention.
Figure 2:
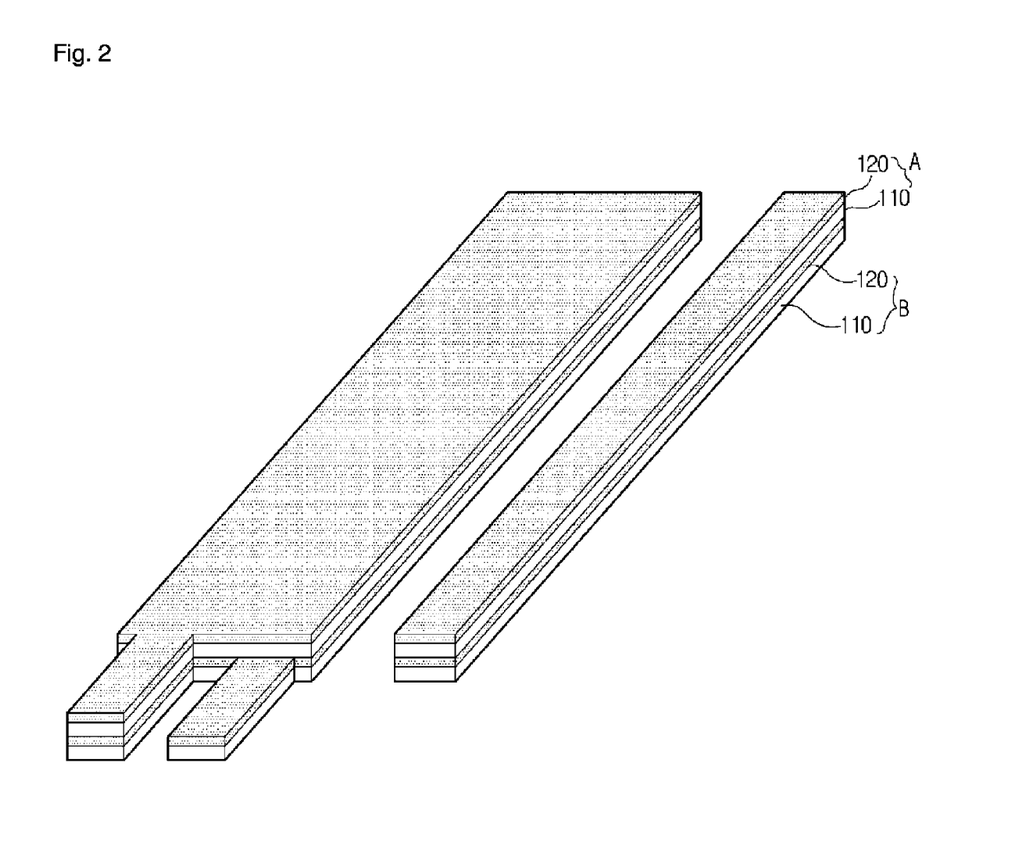
FIG. 2 is a partially cut-away exploded perspective view of the leak sensor for the side detection according to the first embodiment of the present invention.

Referring to FIGS. 1 and 2, a leak sensor for side detection according to a first embodiment of the present invention includes a base layer 110 which has corrosion resistance against chemical agents, and a sensor layer 120 which has also the corrosion resistance against the chemical agents.

The base layer 110 is formed by soaking a plate-shaped structure into a resin, particularly a fluorine-based resin solution for a predetermined period of time. Here, the plate-shaped structure is a structure which forms a frame of the base layer 110, and may be formed of a mesh-shaped glass fiber. Alternatively, the base layer 110 may be formed as a plate-shape structure formed of a resin, particularly a fluorine-based resin.

The sensor layer 120 includes a leak detection part having a predetermined area which is formed by mixing a fluorine-based liquid resin with a conductive material and then coating or printing a mixture thereof on an upper surface of the base layer 110 according to a predetermined pattern. Here, in the pattern of the sensor layer 120, a positive (+) conducting wire and a negative (−) conducting wire are alternately arranged in a zigzag shape, and thus form a detection region having a predetermined area.

The fluorine-based resin used in the base layer 110 and the sensor layer 120 may be, for example, ethylene tetrafluoroethlyene (ETFE), fluorinated ethylene prophylene (FEP), polytetrafluoroethylene (PTFE), perfluorinated acids (PFA) or the like which has excellent chemical resistance and heat resistance.

Here, the leak detection part formed at the sensor layer 120 may be formed over the whole portion of one surface of the sensor layer 120. That is to say the leak detection part of the sensor layer 120 is formed one surface of the sensor layer 120 which faces away from an upper surface of the base layer 110. In addition, the leak detection part may be formed on the side surface of the sensor layer 120. Therefore, the leak sensor for side detection according to the present invention can detect both a leaked fluid which falls down on an upper portion of the sensor layer 120 and a leaked fluid which falls down on the floor and flows in toward the sensor layer 120 in the lateral direction of the sensor layer 120.

The base layer 110 and the sensor layer 120 may be plastic-worked for a predetermined period of time at a predetermined temperature, and then may be coupled to form one sensor module A. To form the leak sensor, the sensor module A is coupled to another sensor module having a base layer and a sensor layer to be arranged one above the other. At this point, the coupling between the sensor modules may be performed by the plastic working for a predetermined period of time at a predetermined temperature, in the same manner as the coupling between the base layer 110 and the sensor layer 120. The drawings provided in the specification illustrate the leak sensor in which two sensor modules A and B are coupled. However, if necessary, the number of sensor modules forming the leak sensor may be two or more. For example, the present invention can have two or more sensor modules, and can additionally detect a fluid level according to detected information of the sensor modules.

As described above, the leak sensor having a plurality of sensor modules A and B includes the leak detection part formed on an upper surface thereof, and another leak detection part formed on the side surface thereof, and thus can detect both the leaked fluid which falls down on an upper side and the leaked fluid which falls down on a floor and flows in towards the leak sensor.

In other words, according to the present invention, the leak sensor can be in contact with the fluid which flows on a floor even though being not located just under the leak fluid, and thus can detect the leaked fluid.

Figure 3:
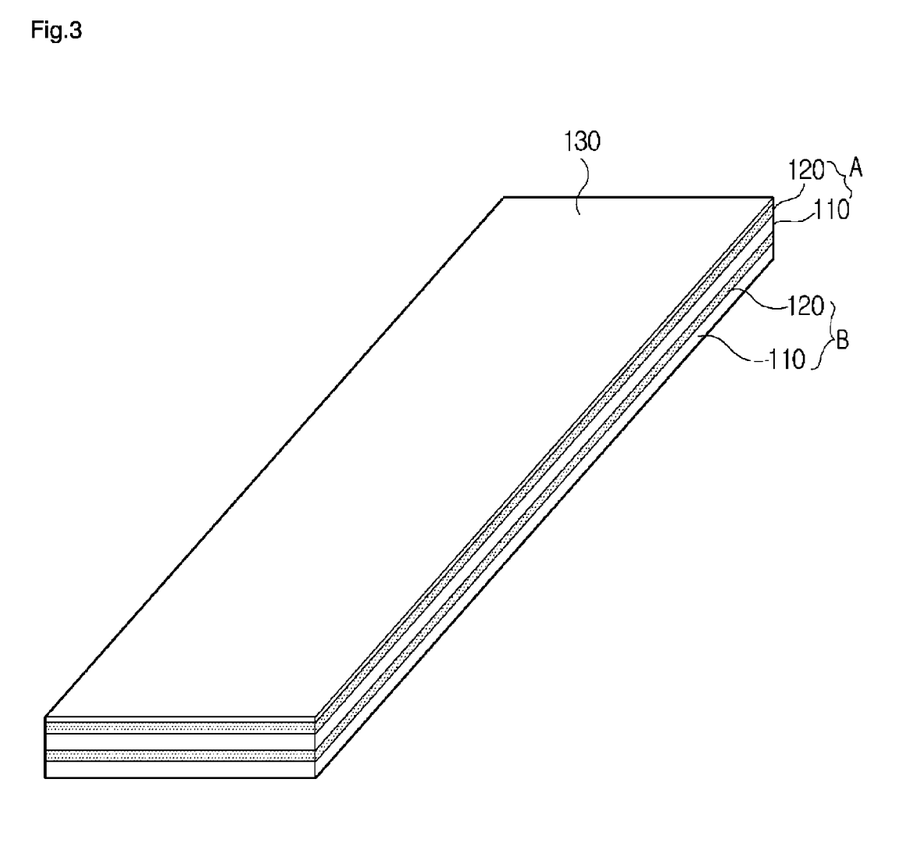
FIG. 3 is a perspective view schematically illustrating a leak sensor for side detection according to a second embodiment of the present invention.

Referring to FIG. 3, in a leak sensor for side detection according to a second embodiment of the present invention, a separate protection layer 130 may be arranged uppermost such that it is coupled to the upper surface of the sensor layer 120. Like the base layer 110, the protection layer 130 is formed as a plate-shape structure formed of a resin, particularly a fluorine-based resin. The protection layer 130 is coupled to the upper surface of the sensor layer 120 through the plastic coupling, and thus may protect the sensor layer 120.

The protection layer 130 serves to prevent the sensor layer 120 from being damaged in case an operator steps on the sensor layer or other objects falls down on the sensor layer. Here, when the protection layer 130 is coupled to the leak sensor, the leak sensor according to the present invention cannot detect any more the leaked fluid which falls down from the top, and can detect only the leaked fluid, which flows out in the lateral direction, through the leak detection part which is exposed on the side thereof.

Although not illustrated, an edge of the protection layer 130 extends outward further than the sensor layer 120 by a predetermined distance. Such an extension of the protection layer 130 is to prevent the leak detection part of the sensor layer 120 from being in contact with conductive foreign substances other than the leaked fluid, e.g., metal powders or the like generated at a work site, and thus to prevent malfunction of the leak sensor.

Figure 4:
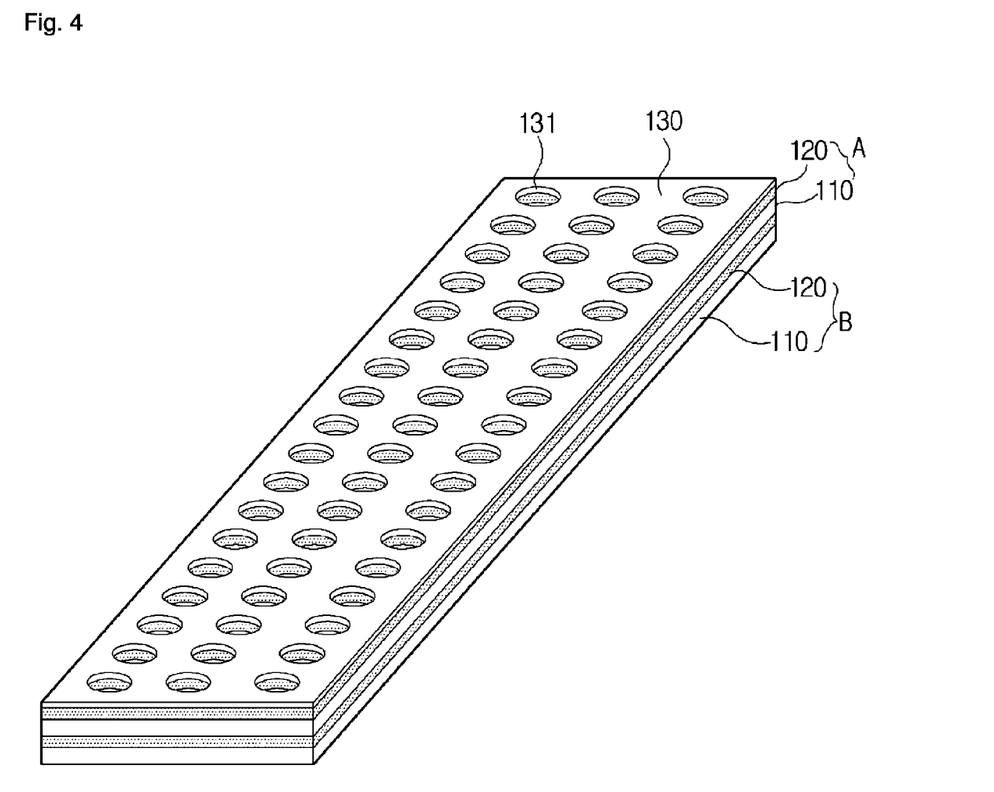
FIG. 4 is a perspective view schematically illustrating a leak sensor for side detection according to a third embodiment of the present invention.
Figure 5:
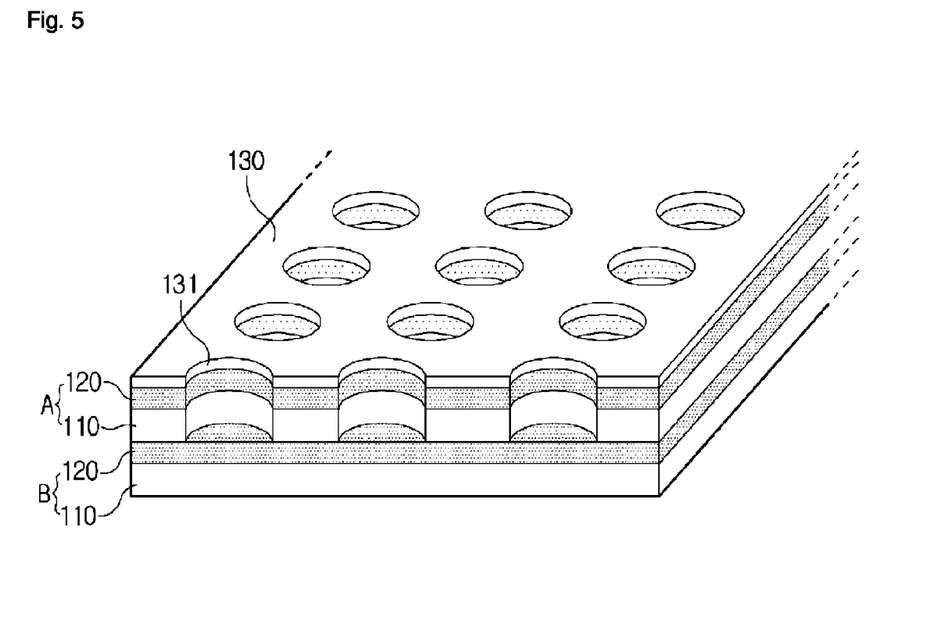
FIG. 5 is a cut-away exploded perspective view of the leak sensor for the side detection according to the third embodiment of the present invention, and illustrates an upper surface leak detecting means.

Referring to FIGS. 4 and 5, a leak sensor for side detection according to a third embodiment of the present invention includes two or more sensor modules A and B. The protection layer 130 is coupled to the upper surface of the uppermost sensor layer 120. A side surface leak detecting means and an upper surface leak detecting means are provided. Here, an upper sensor module A is referred to as a first sensor module, and a lower sensor module B is referred to as a second sensor module.

The side surface leak detecting means is formed of the sensor layer 120 having the side surface thereof exposed to the outside, as described in the first and second embodiments. Meanwhile, the upper surface leak detecting means is formed of a plurality of through-grooves 131 which is formed from the protection layer 130 up to an upper portion of the leak detection part of the sensor layer 120. However, in this embodiment, the through-grooves are not formed in the second sensor module, that is to say the lowermost sensor module.

Specifically, the through-grooves 131 are formed to pass, in turn, through the protection layer 130, the sensor layer 120 and the base layer 110, starting from an upper surface of the protection layer 130. That is, the through-grooves 131 pass through the protection layer 130 and the first sensor module A. The plurality of through-grooves 131 are arranged over the entire leak sensor such that they are spaced apart from each other at predetermined intervals.

Due to the through-grooves 131, an upper surface of the leak detection part of the sensor layer 120 of the second sensor module B is exposed upward, and the leak detection part of the sensor layer 120 of the first sensor module A is formed on the circumference of the through-grooves 131 of the first sensor module A to be exposed to the outside.

Accordingly, even though the leak sensor for the side detection according to the third embodiment of the present invention has the protection layer 130, the leak detection part of the sensor layer 120 can be in contact with the fluid introduced into the through-grooves 131, and thus can detect the fluid. Also, like the first and second embodiments, since the leak sensor for the side detection according to the third embodiment of the present invention can be in contact with the fluid, which flows along the lateral direction, the leak sensor can detect leakage through the leak detection part of the sensor layer 120 formed on the side surface of the leak sensor to be exposed to the outside.

Figure 6:
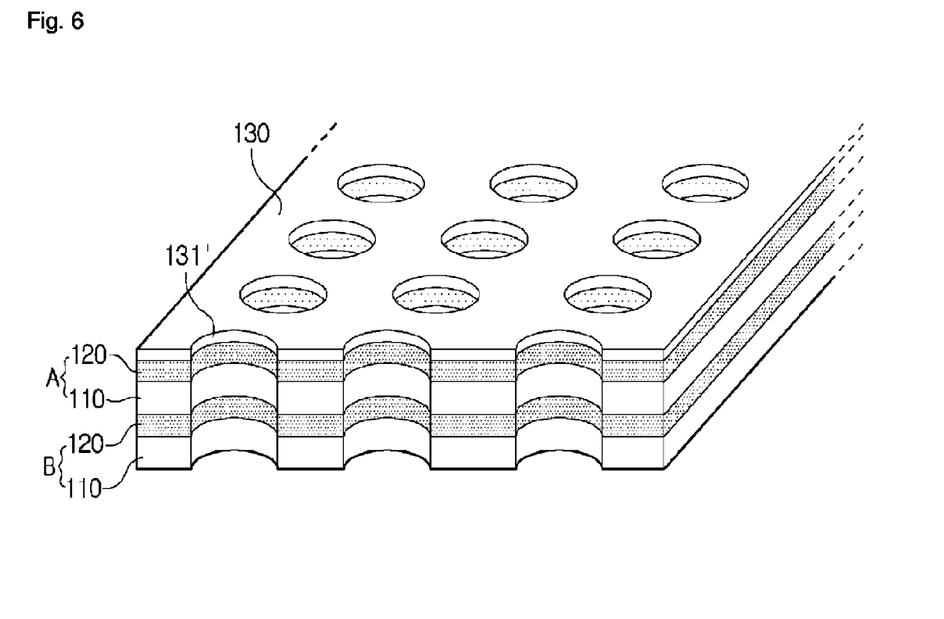
FIG. 6 is a cut-away exploded perspective view of the leak sensor for the side detection according to the third embodiment of the present invention, and illustrates an upper surface leak detecting means which is different from that of FIG. 5.

Referring to FIG. 6, the leak sensor for the side detection according to the third embodiment of the present invention may have another type of the upper surface detecting means which is different from that illustrated in FIG. 5.

Specifically, the upper surface detecting means illustrated in FIG. 6 is formed of a plurality of through-holes 131' which vertically pass through the leak sensor. Like the above-described through-grooves 131, the plurality of through-holes 131' are also arranged over the entire leak sensor such that they are spaced apart from each other at predetermined intervals.

Specifically, the through-holes 131' are formed to pass, in turn, through the upper sensor layer 120, the upper base layer 110, the lower sensor layer 120 and lower the base layer 110, starting from the uppermost protection layer 130. That is, the through-holes 131' pass through all of the protection layer 130, the first sensor module A and the second sensor module B.

Due to the through-holes 131', the leak detection parts of the upper sensor layer 120 of the first sensor module A and the lower sensor layer 120 of the second module B are formed on the side surface of the sensor layers to be exposed to the outside.

Therefore, even though the leak sensor for the side detection according to the third embodiment of the present invention has the protection layer 130, the leak detection part of the sensor layer 120 can be in contact with the fluid introduced into the through-holes 131', and thus can detect the fluid. Also, the fluid introduced into the through-holes 131' may be discharged to an outside of the leak sensor through the base layer 110 located lowermost.

Figure 7:
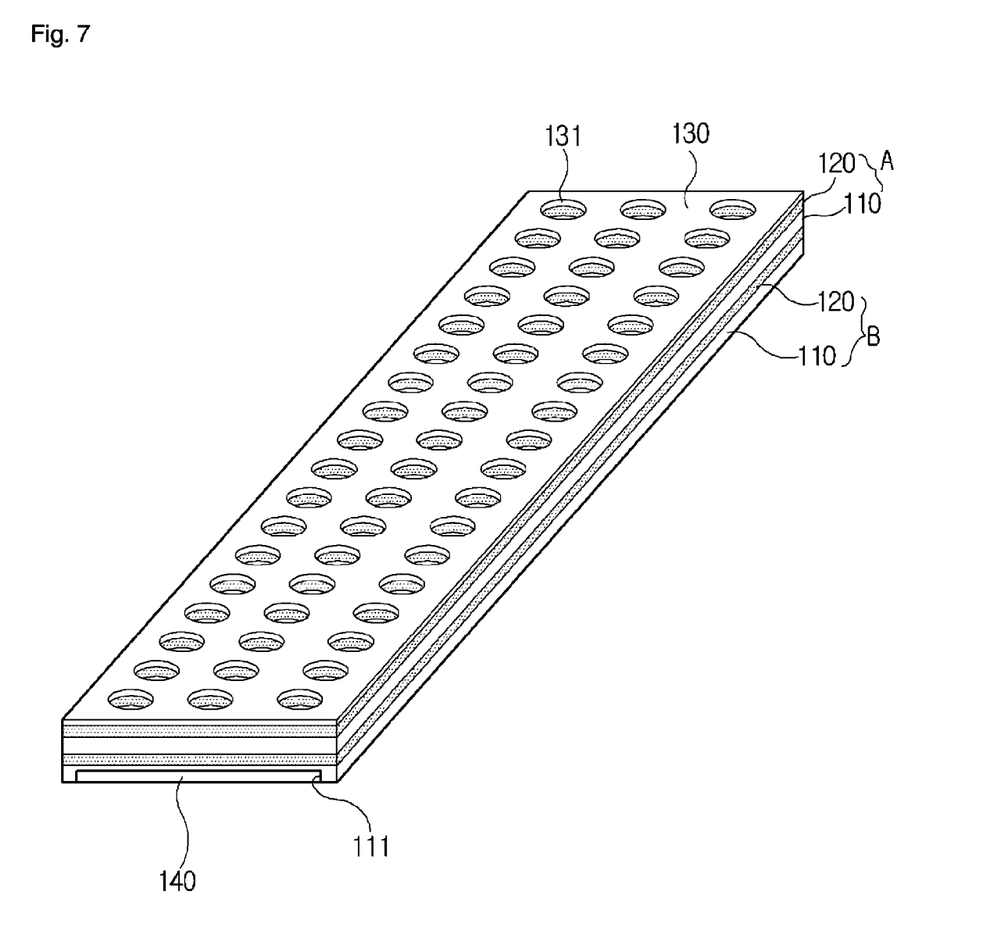
FIG. 7 is a perspective view schematically illustrating a leak sensor for side detection according to a fourth embodiment of the present invention.

Referring to FIG. 7, a leak sensor for the side detection according to a fourth embodiment of the present invention may be bonded to another structure or a bottom of the work site through an adhesive tape 140. To this end, an accommodation groove 111 having a predetermined area is formed at a lower surface of the base layer 110 which is located at the lowermost side. And the adhesive tape 140 is attached to the accommodation groove 111.

As described above, since the adhesive tape 140 is attached to the accommodation groove 111 of the base layer 110, the leak sensor is adhered to the another structure or the bottom of the work site, and thus the adhesive tape 140 and the base layer 110 are arranged substantially on the same plane, thus a clearance is rarely generated between the lowermost base layer 110, and another structure different from the lowermost base layer 110 or an adhesive surface of a bottom of the work site.

Therefore, the leaked fluid flowing in toward the leak sensor does not cross the bottom of the leak sensor, and is in contact with the leak detection part of the sensor layer 120, and thus detecting performance of the leaked fluid can be ensured.

According to the present invention, the leak sensor can be in contact with a fluid flowing on a floor even through being not located just under the leaked fluid, and thus can detect leakage of the fluid.

Also, according to the present invention, both the leaked fluid falling down on the top surface of the leak sensor and the leaked fluid which falls down from the top and flows on the floor can be detected, and also can additionally detect a level of the leaked fluid.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A leak sensor for side detection comprising:
    a base layer which is formed by soaking a plate-shaped structure into a resin solution, particularly a fluorine-based resin solution, or formed of a plate-shaped structure of a resin, particularly a fluorine-based resin; and
    a sensor layer in which a leak detection part having a predetermined area is formed by coating or printing a mixture of a liquid resin, particularly a fluorine-based liquid resin and a conductive material on the base layer in a predetermined pattern,
    wherein the leak detection part of the sensor layer is formed on a side surface of the sensor layer such that the side surface thereof is exposed to the outside and the base layer and the sensor layer form one sensor module.

2. The leak sensor for side detection according to claim 1, wherein an accommodation groove having a predetermined area is formed at a lower surface of the lowest sensor module, and an adhesive tape for adhering the base layer to another structure or a bottom is attached to the accommodation groove.

3. The leak sensor for side detection according to claim 1, wherein the base layer and the sensor layer is plastic-worked for a predetermined period of time at a predetermined temperature to form the sensor module, and the sensor module is coupled to another sensor module to be arranged one above the other.

4. The leak sensor for side detection according to claim 3, wherein the coupling between the sensor modules is performed by plastic-working the sensor modules for the predetermined period of time at the predetermined temperature.

5. The leak sensor for side detection according to claim 1, wherein a protection layer formed of the resin, particularly the fluorine-based resin is coupled to an upper surface of the sensor layer.

6. The leak sensor for side detection for according to claim 5, comprising two or more sensor modules, and further comprising a plurality of through-grooves which pass through at least one sensor module such that the sensor layer of the at least one sensor module is exposed laterally to the outside and a sensor layer arranged below the base layer passed through is exposed upwardly to the outside, to thus form a leak detection part of the leak sensor; and wherein in the lowest sensor module the through-grooves are not formed.

7. The leak sensor for side detection according to claim 5, comprising two or more sensor modules, and further comprising a plurality of through-grooves which pass through all of the protection layer and the sensor modules such that they are exposed laterally to the outside to form a leak detection part of the leak sensor.

8. The leak sensor for side detection according to claim 5, wherein an edge of the protection layer extends outward further than the sensor layer.

9. The leak sensor for side detection according to claim 5, wherein an accommodation groove having a predetermined area is formed at a lower surface of the lowest sensor module, and an adhesive tape for adhering the base layer to another structure or a bottom is attached to the accommodation groove.

* * * * *